Patented Jan. 19, 1954

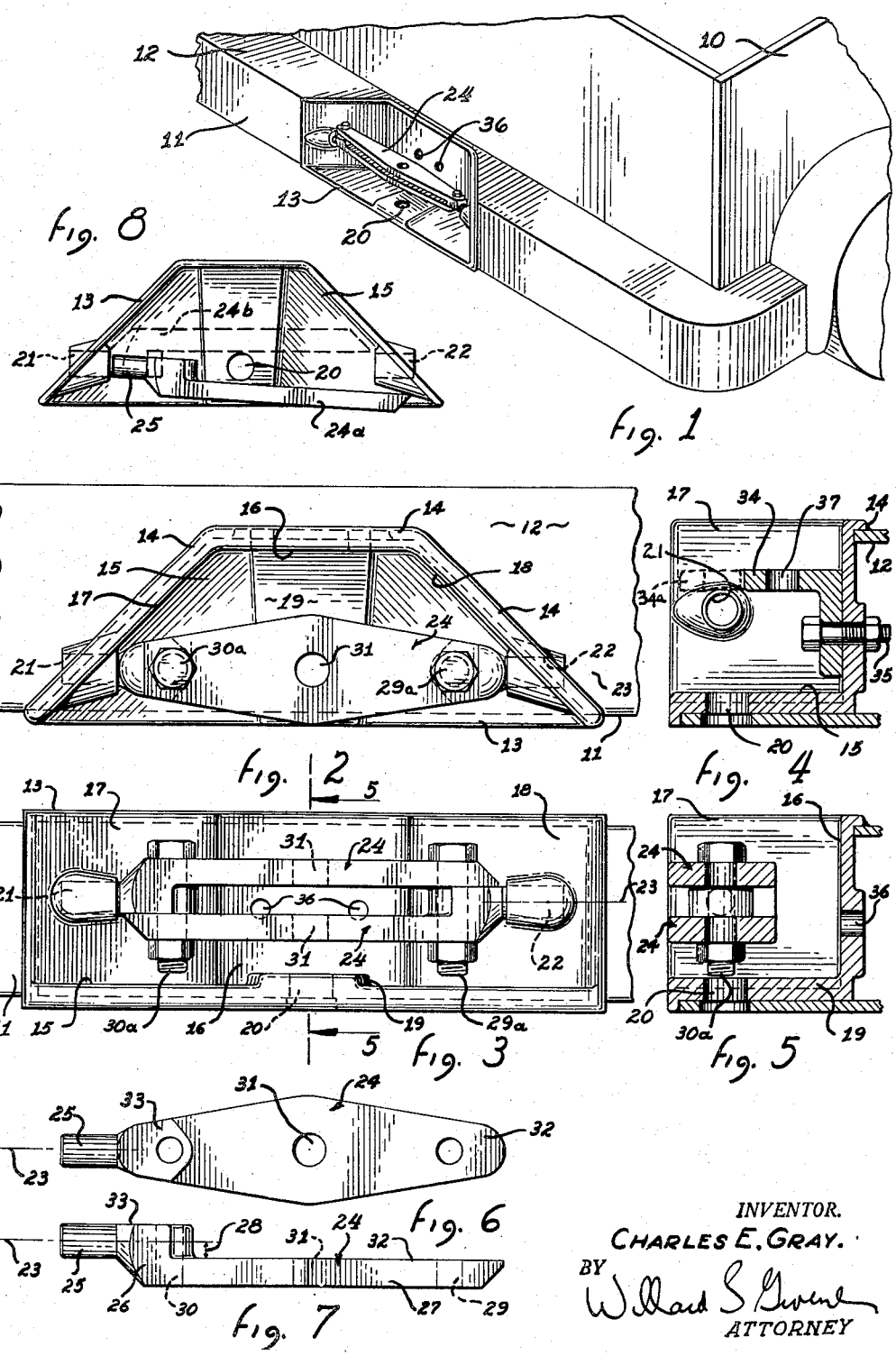

2,666,654

UNITED STATES PATENT OFFICE 2,666,654

UNIVERSAL BUMPER HITCH

Charles E. Gray, Tolleson, Ariz., assignor to Phoenix Engineering & Mfg. Company, Phoenix, Ariz.

Application March 12, 1953, Serial No. 341,993

5 Claims. (Cl. 280—492)

This invention pertains to improvements in universal bumper hitches and is particularly directed to a unit which may be welded into the bumper structure of a vehicle to form a universal coupling between the vehicle and the apparatus to be towed, pulled or pushed by the vehicle.

One of the objects of this invention is to provide an improved universal bumper hitch for trailer or the like which is simple in construction, universal in use and highly rigid and strong under all operating conditions.

Still another object of this invention is to provide an improved bumper hitch having removable members of simple and sturdy design for making the hitch adapted for universal use or for direct drawbar pull.

Still another object of this invention is to provide an improved universal bumper hitch of neat and clean-cut appearance and efficient to operate at all times without unnecessary backlash noise or rattle being present.

Still another object of this invention is to provide an improved bumper hitch having a single base element and a pair of duplicate trunnion clevises forming the entire universal mounting device.

Still another object of this invention is to provide an improved universal bumper hitch including a main steel housing and a pair of duplicate clevises which may be readily inserted in or removed from supporting bearing bores in the housing so as to render the device readily adaptable to universal coupling or direct drawbar pull on the housing through pin and link connection.

Still another object of this invention is to provide an improved universal bumper hitch which is readily adaptable to direct drawbar pull or universal coupling to a vehicle to be towed.

Further features and advantages of this invention will appear from a detailed description of the drawings in which:

Fig. 1 is a rear perspective view of a vehicle incorporating the universal bumper hitch having the features of this invention.

Fig. 2 is an enlarged fragmentary plan view of the universal bumper hitch shown in Fig. 1.

Fig. 3 is a rear elevation of the unit shown in Fig. 2.

Fig. 4 is a right hand end section of the unit shown in Fig. 3.

Fig. 5 is a section on the line 5—5 of Fig. 3.

Fig. 6 is a plan view of one of the duplicate clevises.

Fig. 7 is a side view of the clevis shown in Fig. 6.

Fig. 8 is a diagrammatic view showing the method of inserting the clevises in operative position in the hitch unit.

As illustrative of one embodiment of this invention there is shown a motor vehicle 10 having the bumper structure 11 including a step plate 12 of well known design rigidly secured to the chassis of the vehicle. A main housing 13 is preferably provided with a lip 14 by which it is securely welded to the bumper structure 11 and step plate 12 so that in this manner it is rigidly secured to the chassis of the motor vehicle 10. The main housing 13 has a bottom 15, a back 16, and divergently disposed sides 17 and 18 all rigidly secured to the bottom 15. The bottom may preferably be formed with a boss 19 having a bore 20 to be used in the manner of an ordinary pin and link trailer hitch if desired.

In each of the divergent sides 17 and 18 there are respectively formed the transverse horizontally disposed bearing bores 21 and 22 defining a common axis 23. A pair of identical demountable clevis pieces 24 as shown in Figs. 6 and 7 are each provided with trunnions 25 which may be inserted in and are rotatably journaled in the respective bores 21 and 22 in the housing member 13. Each of the clevises comprise the integral body portion 26 upon which is integrally formed the trunnions 25, and the spaced bolt supporting and pivot pin carrying portions 27. It is to be noted that the portion 27 is offset from the axis 23 of the trunnion 25 as indicated by the dimension 28. The portion 27 further has the bolt holes 29 in the outer end and 30 in the body portion 26 through which pass appropriate bolts 29a and 30a to secure the two clevis pieces together as a rigid structure when inserted in the housing member 13 as best seen in Figs. 2 and 3. The central pivot pin bores 31 are in alignment in both of the clevises and serve to provide the main pivot for relative horizontal movement of the vehicle and trailer being towed and a suitable pin is placed through the holes 31 and through a tongue in the vehicle as desired.

It will be noted that to insert the clevises into operative position as shown in Figs. 2 and 3, the first clevis is positioned as shown at 24a in Fig. 8 and its trunnion then inserted into one of the bores, such as the bore 21 by moving it to the left as seen in Fig. 8. The clevis thus inserted is then rotated 180 degrees to the position 24b, Fig. 8. The second clevis member is then inserted in the bore 22 in the same relative position as the position 24a for the first one and when in this position will properly align up in engagement with the first inserted clevis. In other words, the inner surfaces 32 of the clevises engage the abutment surfaces 33 of the body portion 26 of each respective clevis and are rigidly held thereagainst with the trunnions 25 of each clevis in proper alignment with the axis 23 defining the bores 21 and 22 in the housing when the bolts 29a and 30a are drawn up tight.

It will therefore be noted that with the pin in the bores 31 horizontal relative rocking movement can take place between the vehicle and element to be towed whereas the up and down relative pivotal motion is accommodated by the rocking motion of the trunnions 25 in the bores 21 and 22 of the main housing 13. There has thus been provided a fully universal mounting of rigid strong construction and which may be readily disassembled and demounted from the main housing 13 to render it accessible either as a step to get into the vehicle or utilizing it as an ordinary trailer hitch with the opening 20. It is also possible to apply an additional bracket 34 held in place by suitable bolts 35 having a horizontal portion 36 and a pintle hole 37 which, if required, as shown in broken lines at 34a, may be aligned with the bore 20 so that a pintle may be passed through both hole 37 and bore 20 for use as an ordinary towing hitch.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A universal bumper hitch comprising, a housing rigidly fixed to the chassis of a towing vehicle, a pair of transversely spaced trunnion bores formed in said housing, a pair of clevises, a trunnion on each of said clevises adapted to be received by said trunnion bores, a bolt and pivot pin carrying portion on each of said clevises, a body portion interconnecting said trunnion and bolt and pivot pin carrying portion of said clevises, offset inner surfaces on said clevises adapted to engage abutment surfaces on said clevises when said trunnions are inserted in said trunnion bores, and clamping means to secure said clevises together as a rigid unit journaled on said trunnions in said housing.

2. A universal bumper hitch comprising, a housing rigidly fixed to the chassis of a towing vehicle, a pair of transversely spaced trunnion bores formed in said housing, a pair of clevises, a trunnion on each of said clevises adapted to be received by said trunnion bores, a bolt and pivot pin carrying portion on each of said clevises, a body portion interconnecting said trunnion and bolt and pivot pin carrying portion of said clevises, offset inner surfaces on said clevises adapted to engage abutment surfaces on said clevises when said trunnions are inserted in said trunnion bores, bolt holes in the outer ends of said bolt and pivot pin carrying portion of said clevises, bolt holes in said body interconnecting body portion of said clevises, and a pair of clamping bolts passing through said bolt holes in said clevises to secure them together as a rigid structure with their trunnions in alignment and journaled in said trunnion bores in said housing.

3. A universal bumper hitch comprising, a housing rigidly fixed to the chassis of a towing vehicle, a pair of transversely spaced trunnion bores formed in said housing, a pair of clevises, a trunnion on each of said clevises adapted to be received by said trunnion bores, a bolt and pivot pin carrying portion on each of said clevises, a body portion interconnecting said trunnion and bolt and pivot pin carrying portion of said clevises, offset inner surfaces on said clevises adapted to engage abutment surfaces on said clevises when said trunnions are inserted in said trunnion bores, bolt holes in the outer ends of said bolt and pivot pin carrying portion of said clevises, bolt holes in said body interconnecting body portion of said clevises, a pair of clamping bolts passing through said bolt holes in said clevises to secure them together as a rigid structure with their trunnions in alignment and journaled in said trunnion bores in said housing, and a pivot pin bore fixed in the bolt and pivot pin carrying portion of said clevises located intermediate said bolt holes adapted to receive a pin to attach a vehicle to be towed.

4. A universal hitch including a housing rigidly secured to a vehicle chassis, a pair of spaced trunnion bores formed in said housing in alignment with a horizontal transverse axis, a pair of clevises, a trunnion on one end of each of said clevises, offset inner surfaces on each of said clevises displaced radially of said trunnions an abutment surface on each clevis adapted to engage the inner surface of the other clevis when said clevises are placed together with a trunnion of one clevis in one of said trunnion bores and the trunnion of the other clevis in said other trunnion bore, a clamping bolt means passing through said clevises at right angles to said offset surfaces for securing said clevises rigidly together while having a slotted opening between said trunnions, and a pivot pin hole in each of said clevises intermediate said bolt means for securing a pivot pin across said slotted opening.

5. A hitch connection comprising, a housing fixed to a towing vehicle, a pair of identical clevises, a trunnion on each clevis, means for clamping said clevises together with a trunnion of each clevis at opposite ends of the pair of assembled clevises, means for connecting a vehicle to be towed to said pair of assembled clevises including a pivot pin hole in each of said clevises, and means in said housing to receive when disassembled and to pivotally support when assembled said clevises on said trunnions.

CHARLES E. GRAY.

References Cited in the file of this patent
UNITED STATES PATENTS

| Number | Name | Date |
|---|---|---|
| 1,934,141 | Prentice | Nov. 7, 1933 |
| 2,027,499 | Tully | Jan. 14, 1936 |
| 2,492,914 | Barden | Dec. 27, 1949 |
| 2,551,136 | Keltner | May 1, 1951 |